UNITED STATES PATENT OFFICE.

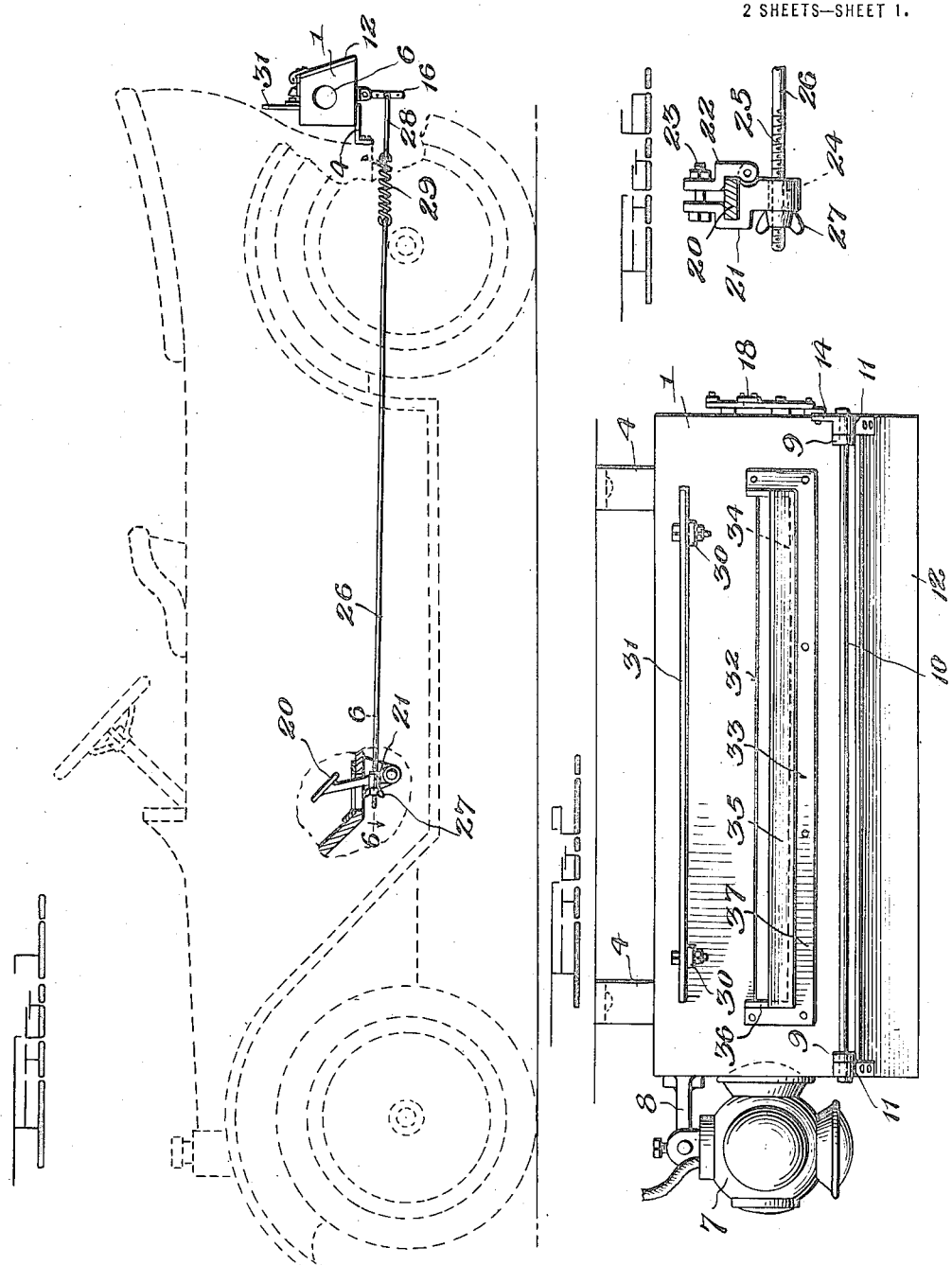

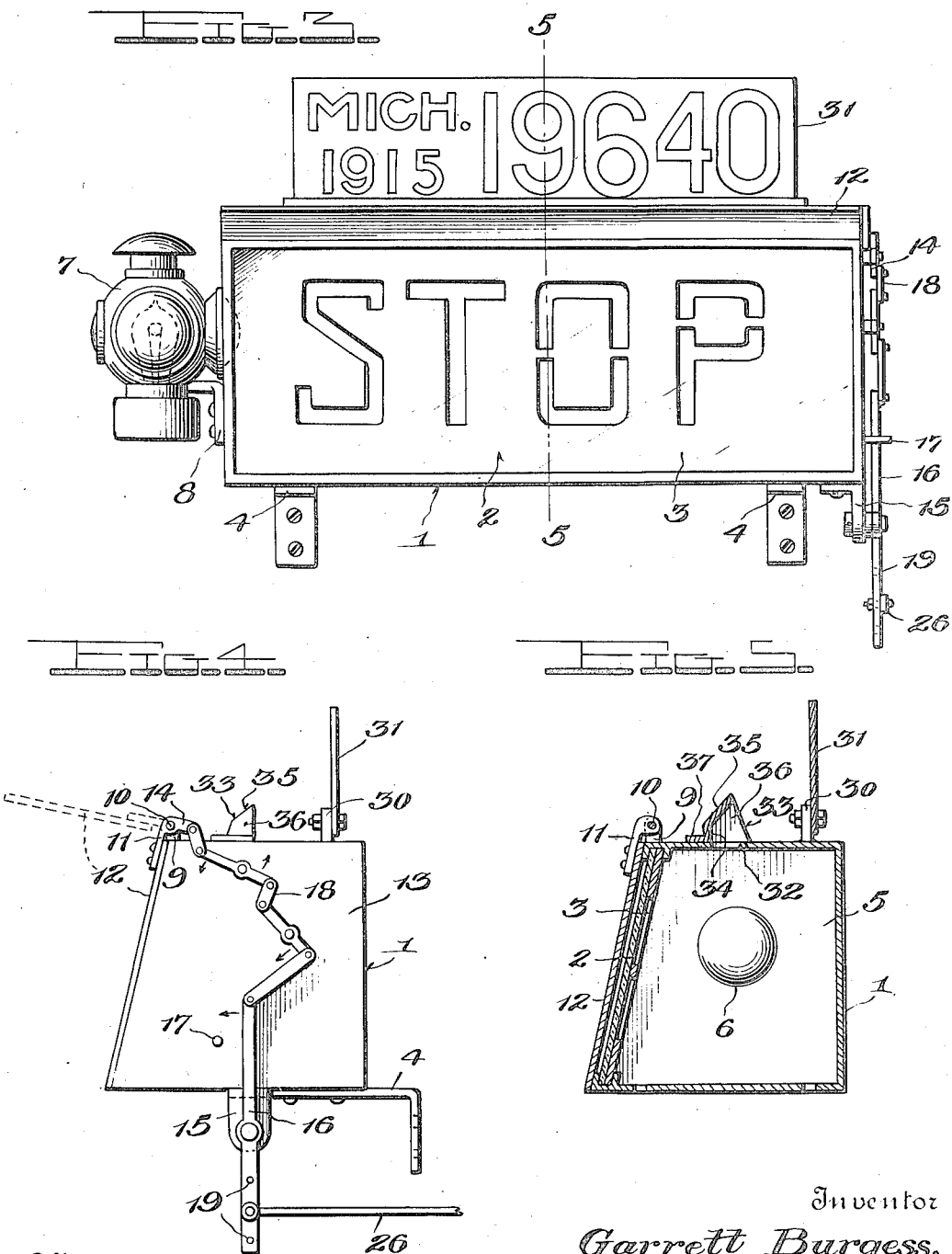

GARRETT BURGESS, OF DETROIT, MICHIGAN.

SIGNALING DEVICE FOR VEHICLES.

1,216,207.
Specification of Letters Patent.
Patented Feb. 13, 1917.

Application filed January 24, 1916. Serial No. 73,938.

*To all whom it may concern:*

Be it known that I, GARRETT BURGESS, a citizen of the United States, residing at Detroit, in the county of Wayne and State of Michigan, have invented certain new and useful Improvements in Signaling Devices for Vehicles; and I do declare the following to be a full, clear, and exact description of the invention, such as will enable others skilled in the art to which it appertains to make and use the same.

This invention relates to new and useful improvements in signals for vehicles, and the primary object of the invention is to provide a signaling device that is adapted to be attached to the rear of an automobile and which consists of a lamp box having on one side of the same a transparent sign that is normally covered, and means connected with the foot brake of the automobile whereby upon application of the brake the cover is lifted and the sign or signal is revealed.

Another object of this invention is to provide on the top of the lamp box a reflector, that is adapted to reflect the light from the box upon a sign secured to said top.

A further object of the invention is to provide a device of this character which is simple and durable in construction, inexpensive to manufacture, and one which will be very efficient in operation.

With these and numerous other objects in view my invention consists of the novel features of construction, combination and arrangement of parts which will be herein referred to and more particularly pointed out in the specification and claim.

In the accompanying drawings:

Figure 1 is a side elevation of an automobile, shown in dotted lines illustrating the application of my invention thereto;

Fig. 2 is a top plan view of the lamp box and lamp that is secured to the rear of the automobile;

Fig. 3 is a side elevation of the same;

Fig. 4 is an end view of the box;

Fig. 5 is a central vertical transverse section taken through the box on the line 5—5 of Fig. 3; and, Fig. 6 is a detail view taken on the line 6—6 of Fig. 1.

In the present embodiment of my invention, I have shown the signal device applied to an automobile, as clearly illustrated in Fig. 1 of the drawings and the numeral 1 designates a substantially rectangular shaped lamp box having an open outer side 2 in which is positioned a transparent sign 3, reading in the present embodiment of this invention the word "Stop." This sign may be secured to the outer side of the box in any preferred manner, preferably as illustrated in Fig. 5 of the drawing. The lamp box 1 is supported adjacent the rear of the automobile by means of a pair of angular brackets 4, which have one of their portions secured to the automobile, while the other is fastened to the bottom of the box. The outer side of the box 1 is preferably inclined so that the sign held therein will be supported at an angle, the purpose of which is obvious.

One end of the box 1 that is designated by the numeral 5 has positioned therein an aperture 6 in which is adapted to be held one lens of a tail lamp 7, that is supported in position by means of a bracket 8 secured to the outer surface of the end 5. This tail lamp 7 may be of any desired type employing either oil or electricity as desired.

Projecting upwardly from the top of the lamp box 1 adjacent the open outer side of the same are a pair of bearings 9, that are adapted to rotatably support thereby a longitudinally extending rod 10. These bearings 9 are disposed adjacent either end of the box, but are spaced a predetermined distance therefrom, so that a pair of hinge members 11 are adapted to be mounted thereon. Secured to the hinge members 11 is a swinging door 12, which in normal closed position is adapted to entirely cover the sign 3. The hinge members 11 are securely fastened into engagement with the rod 10, whereby owing to any movement of the door the rod 10 will rotate freely in the bearings 9 so that the door may be easily raised from closed position.

Projecting from one of the bearings 11 at the end of the lamp box opposite the end 5 of the same, which is designated by the numeral 13 is a rearwardly extending arm 14. Secured to the bottom of the lamp box 1 adjacent the end 13 of the same is an angular bracket 15, which has its downwardly extending portion lying flush with the outer surface of said end, and is adapted to have fulcrumed thereon a lever 16. This lever is fulcrumed intermediate its end, so that one portion of the same extends downwardly below the lamp box, while the other extends upwardly a predetermined distance alongside of the end 13 of the same. The movement of the lever 16 is limited by a laterally projecting stud 17, that is disposed in the path of the same and projects from the end 13 of said box.

The upper end of the lever 16 is connected to the projecting arm 14 by a series of multiplying levers 18 which are adapted to multiply to a desired degree any slight movement of the lever 16, so that the door 12 may be swung from closed position, to open position as shown in dotted lines in Fig. 4 of the drawings. This series of multiplying levers consists of a pair of levers fulcrumed intermediate their ends on the end of the box and connected by a link, the free end of one of said levers connected by a short length link to the rearwardly projecting arm on the hinge of the door, while the free end of the other lever is connected by a long link with the upper end of the lever 16. The lower portion of the lever 16 is provided with a plurality of longitudinally spaced openings 19 for a purpose to be hereinafter more fully described.

The lever 16 is operated or moved to open and close the swinging door 12 through the medium of connection by the same with the foot pedal 20 that operates the brake on the automobile. This foot pedal 20 has secured thereto and projecting laterally therefrom at one side a clamp 21, which has a swinging portion 22 that is adapted to surround the said pedal below the tread portion, and is securely engaged therewith by a bolt 23 as clearly illustrated in Fig. 6 of the drawing. The projecting portion of the clamp 21 has a horizontally extending internally threaded opening 24 extending therethrough which is adapted to receive the threaded end 25 of a rod 26. The threaded end 25 of the rod 26 is securely held in desired position by means of a thumb nut 27 that securely clamps the same into engagement with the said clamp. An additional rod 28 is pivotally connected at one end by means of any desired means with the lower end of the lever 16, through one of the apertures 19 in the same. The free ends of the rods 28 and 26 are connected by means of a coiled spring 29, whereby the connection between the pedal 20 and the lever 16 is adapted to be longitudinally extensible. This adjustment is necessary owing to the fact that the movement of the pedal 20 that controls the brake of the automobile in the majority of instances is much greater than that which is necessary to move the lever 16 in order to open the door 12, so that upon the movement of the lever 16 through the operation of the foot pedal, when said lever strikes the stud 17, the door will have been opened, and further movement will be unnecessary, and owing to the longitudinally extensible connection between the lower end of said lever, and the foot pedal through the medium of the coiled spring 29, said pedal will be allowed to move to the fullest extent necessary.

Projecting upwardly from the top of the lamp box 1 and disposed adjacent the inner side of the same are a pair of supports 30, which are adapted to hold in an upright position a sign 31. This sign is preferably for displaying the license number, which all machines are required to be equipped with, and by the above described means that will be readily held in position. The sign 31 is adapted to be illuminated from the lamp box 1 through the medium of a longitudinally extending slot 32 disposed in the top of the same and adjacent the front of said sign, and a reflector 33 which directs the rays of light that pass upwardly through said slot against the face of the sign. This reflector which is substantially hood shaped comprises an upwardly extending portion 34 that is disposed adjacent one side of the slot 32, and has an angular obliquely projecting top 35 that is so positioned as to direct the rays of light full upon the face of the sign 31. The reflector 33 is provided with end plates 36 at either end of the slot 32, and it is securely held into engagement with the top of the lamp box 1 by means of a laterally projecting flange 37, that extends from the side plates, and vertical portion 34 of the same and is adapted to lie flush with the top of said box. This flange 37 is secured in position by means of rivets or any other desired form of fastening means.

By the above described structure it will be obvious that I have provided a signal device that is especially adapted for use on automobiles, whereby when the driver desires to stop the same, upon the application of the foot brake, an illuminated sign will be brought into view at the rear of his machine, so that the occupant of an automobile following, will be warned of the intended stop. The extreme simplicity of this device enables the same to be easily and readily attached to any desired type of automobile, and owing to the fact that the same is automatically operated by application of the foot brake the signal will be shown upon any stoppage of the machine without the necessity of any additional manual operation.

Applicant has employed in this invention the use of the tail light which is ordinarily used on automobiles, to furnish the source of light for his lamp box that illuminates the danger signal, and also as providing for the rays of the same by means of a novel form of reflector to be directed against the license number to illuminate the same at all times. The license number on top of the lamp box will always be obvious, even when the signal is not in operation, and a sufficient amount of light will be directed upon the same to always render it clearly visible.

From the foregoing description of the construction of my improved device, the manner of applying the same to use and the operation thereof will be readily understood and it will be seen that I have provided a simple, inexpensive and efficient means for carrying out the objects of the invention.

This device is operable in daylight when it is not necessary to use the source of light, as the sign may be composed of some material that is readily noticeable, and the cover for the same will operate in the manner hereinbefore described.

I claim as my invention:

A signal device for vehicles comprising a lamp box having one side open, a transparent wall in the open side, a source of light for the box, a bar rotatably mounted on the top of the box adjacent the open side, a door hingedly connected to said bar and normally positioned over the side, a rearwardly projecting arm on one of the hinges of the door at one end of the box, a bracket secured to the bottom of the box, said bracket having one arm projecting downwardly flush with one end of the box, an operating lever fulcrumed intermediate its ends on said arm, the upper end of said lever being disposed adjacent said end of the box, a stop to limit the movement of the lever, a pair of additional levers fulcrumed on said end of the box and connected by a link, a short length link connecting the free end of one of the last mentioned levers with the arm on the hinge, and a long link connecting the free end of the other lever with the upper end of the operating lever, whereby the limited movement of the operating lever will be increased to raise and lower the door.

In testimony whereof I have hereunto set my hand in presence of two subscribing witnesses.

GARRETT BURGESS.

Witnesses:
 Geo. O. Van Sickle,
 Wm. H. Bolitho.